May 22, 1956 W. F. HOLIN 2,746,400
RAILWAY VEHICLE TRACTION MOTOR COOLING SYSTEM
Filed Nov. 5, 1952 2 Sheets-Sheet 1

Inventor
William F. Holin
By
Willits, Helwig & Baillio
Attorneys

United States Patent Office 2,746,400
Patented May 22, 1956

2,746,400
RAILWAY VEHICLE TRACTION MOTOR COOLING SYSTEM

William F. Holin, Riverside, Ill., assignor to General Motors Corporation, Detroit, Mich., a corporation of Delaware Application November 5, 1952, Serial No. 318,880

11 Claims. (Cl. 105—59)

This invention relates generally to railway vehicles and their cooling systems and will be described in particular with electrically powered locomotives utilizing electric motors to drive the vehicle.

It is well known that the traction motors used for driving electrical locomotives must be protected in order to avoid water and other types of foreign matter which might otherwise short the windings of the traction motors and thereby damage them. In order to avoid such contingency these motors are generally encased in a traction motor housing which prevents any moisture or other type of foreign matter from making contact with the traction motor. The use of such housings, however, has a tendency to cause the traction motors to become overheated and therefore it has been found necessary to provide additional means to cool these traction motors. The most common manner of cooling the motors is to force air under pressure supplied by a blower on the locomotive into the traction motor housings. This method of cooling the traction motors, however, has presented certain difficulties since, as is well known, there is some relative movement of the traction motor housing with respect to the locomotive body from which the cooling air is supplied. In past constructions certain means have been rigidly attached to either the locomotive body or the traction motor housing to conduct the cooling air from the locomotive body to the traction motor housing. These past constructions, however, have proved inadequate for several reasons but mainly because there is insufficient room to mount them either on the housing or lower side of the locomotive body. Not only is there insufficient room for the additional structure that is necessary to attach them to either of the above-mentioned places, but there is insufficient room in which to actually do the work of assembling and disassembling. A further disadvantage experienced by having the duct attached to the traction motor housing was that it was always in the way when it was desired to repair or replace a traction motor necessitating its removal before the traction motor could be removed. Also, due to the large amount of vertical and transverse relative movement of the traction motor housing with respect to the locomotive body, a construction which is attached either to the housing or the locomotive body has not proven satisfactory because upon any extreme transverse movement the holes of the traction motor housing and the locomotive body are almost completely misaligned resulting in very little cooling air being conducted into the housing. A further objection has been that this large relative movement causes excessive wear on the wear plates generally used at the floating joint located either at the bottom of the locomotive or the top of the traction motor housing.

It therefore becomes an object of this invention to provide a cooling duct for conducting cooling air from a locomotive body to a traction motor housing which does not require fastening of this duct either to the locomotive body or the traction motor housing.

It is a further object of this invention to provide a cooling duct for conducting cooling air from a locomotive body to a traction motor housing which has only limited relative movement with respect to the body of the locomotive and the traction motor housing.

It is a further object of this invention to provide a unique cooling duct located between the body of the locomotive and the traction motor housing which is fastened to the bolster of a locomotive truck thereby reducing the amount of relative movement of the means connecting the bottom of the locomotive to the top of the traction motor housing for supplying air from the locomotive body to the traction motor housing.

Figure 1:
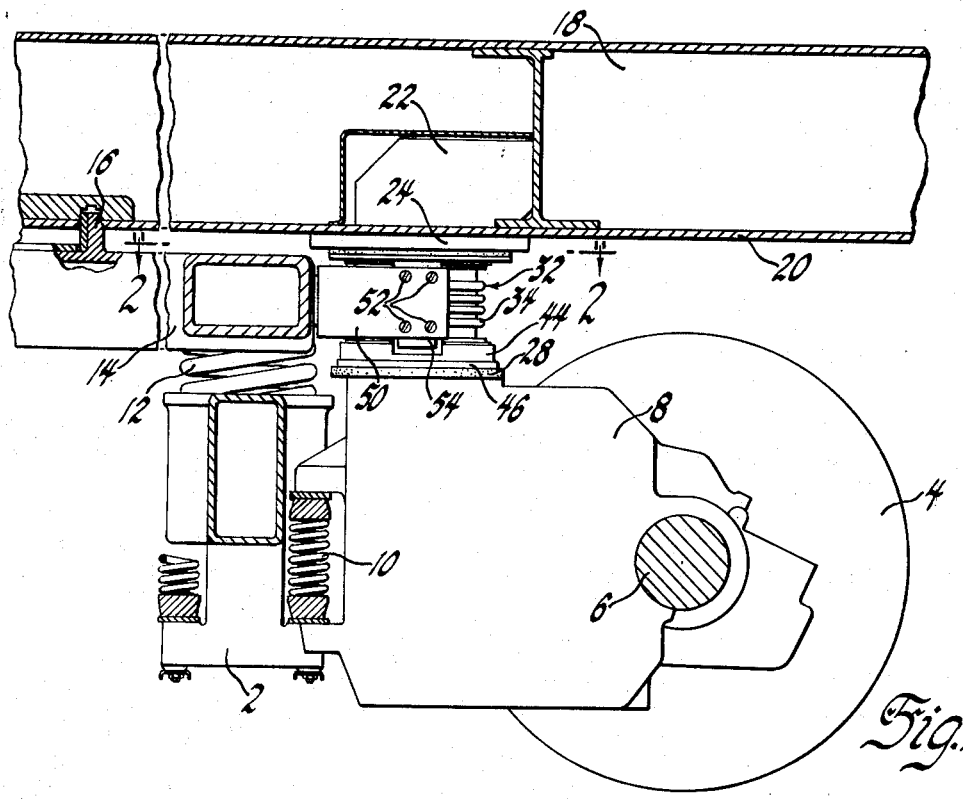
Figure 1 is a fragmentary view of a locomotive truck showing a portion of the supported locomotive body with the unique cooling duct interposed between the bottom of the locomotive body and the top of the traction motor housing and attached to the locomotive bolster.

Referring now to Figure 1 a portion of the usual truck frame 2 is shown with a supporting wheel 4 rotatably attached thereto turning about the axle 6. Supported on the axle 6 is one end of a traction motor housing 8 which encases the traction motor and prevents water and other foreign matter from making contact with the motor. The other end of the traction motor housing 8 is resiliently supported by the spring assembly 10 on the aforementioned truck frame 2. By supporting the traction motor and traction motor housing in the above described manner a certain amount of relative movement may take place between the housing 8 and the truck frame 2.

Resiliently supported on the frame 2 by means of helical coil springs 12 is the usual truck bolster 14 which in turn, by the pivotal means 16, supports one end of the locomotive body indicated generally by the numeral 18. The locomotive body as shown in Figure 1 is made up of the usual longitudinal and transverse shapes and plates with its bottom plate being designated by the numeral 20. Located in the lower portion of the locomotive body is a cooling air passage 22 to which cooling air may be supplied by a blower on the locomotive. Fastened or welded to the bottom plate 20 of the locomotive body 18 is a wear plate 24 which is provided with an aperture in alignment with an opening 26 in the bottom plate 20 terminating the cooling air passage 22. (See Figures 3 and 4.) The upper part of the traction motor housing 8 is also provided with a wear plate 28 defining an opening 30 into the traction motor housing through which cooling air may be supplied. Attached to the truck bolster 14 and supported thereby is a unique cooling duct means indicated generally by 32 for conducting the cooling air from the bottom of the locomotive body to the top of the traction motor housing.

Figure 2:
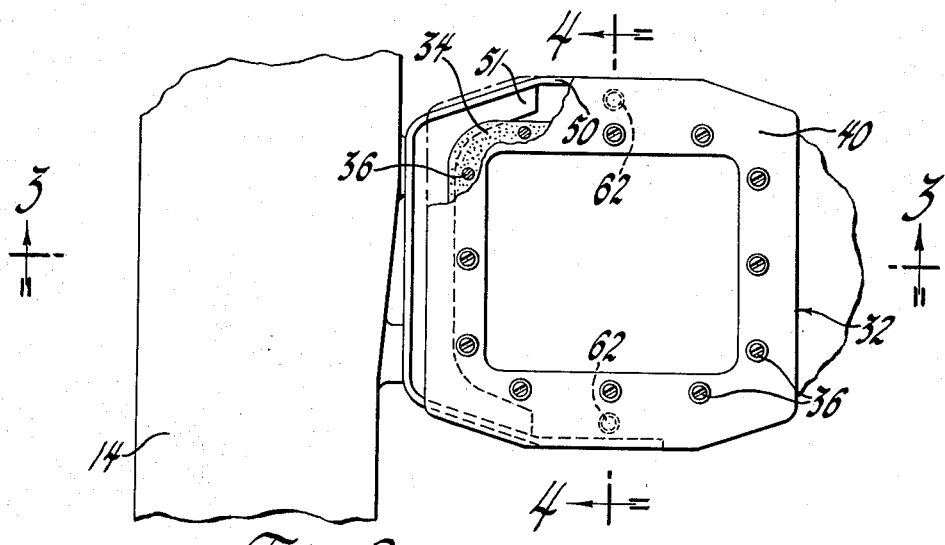
Figure 2 is a view taken along the line 2—2 of Figure 1 and shows the movement of the cooling duct when fastened to the bolster.
Figure 3:
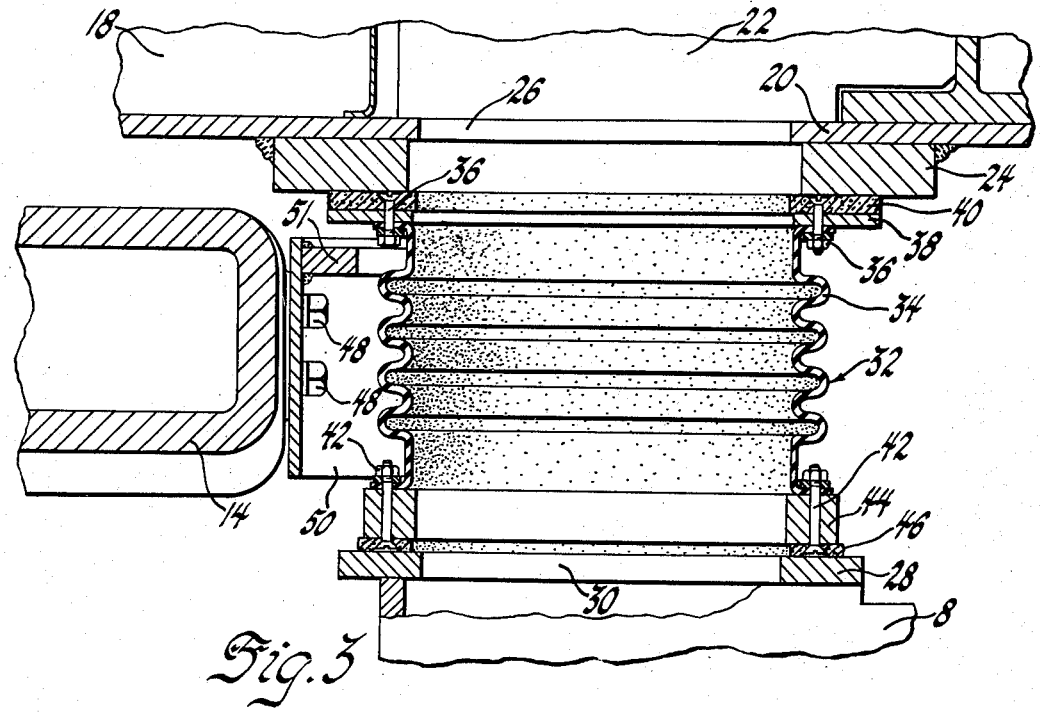
Figure 3 is an enlarged full section taken along the line 3—3 of Figure 2 showing the details of the cooling duct structure.
Figure 4:
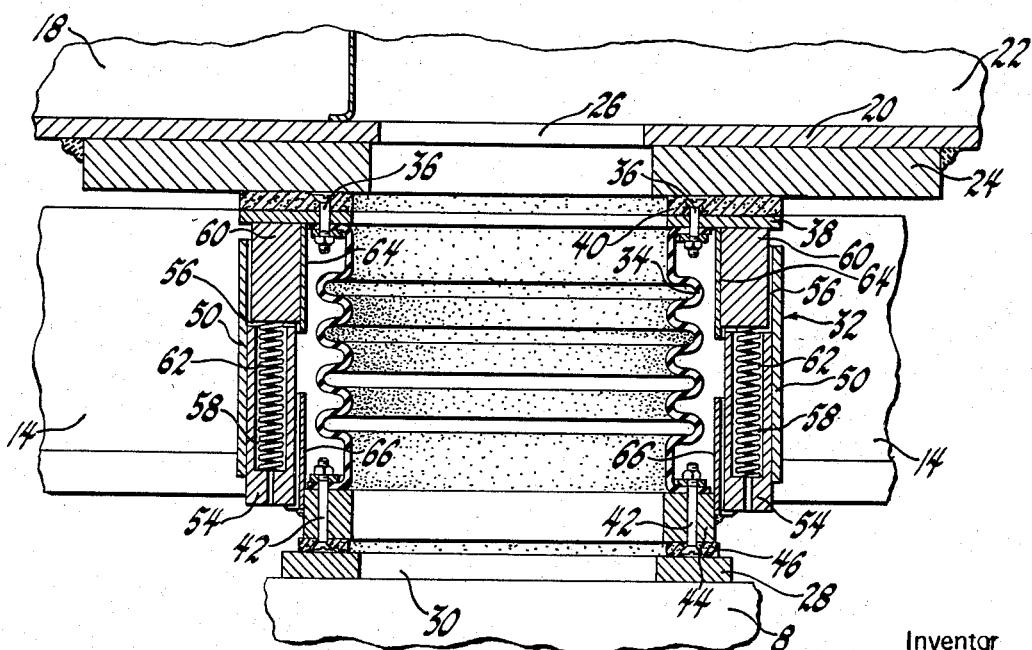
Figure 4 is also an enlarged full section of the cooling duct taken along the line 4—4 of Figure 2.

Referring now to Figures 2, 3 and 4 this new unique means will be more particularly described. The conducting portion of the cooling duct comprises a flexible tube 34 whose upper end is fastened by nut and bolt assemblies 36 to an upper plate support 38 and an upper wear plate 40. The lower end of the flexible tube 34 is fastened in a similar manner by the nut and bolt assemblies 42 to a weighted spacing member 44 and a lower wear plate 46. The upper wear plate 40 and the lower wear plate 46 are provided with flat outwardly facing frictional surfaces which are adapted to frictionally engage flat surfaces on the wear plates 24 and 28 respectively. All of the wear plates referred to may be made of any suitable material such as high carbon steel or some phenolic composition. In the example shown, steel has been chosen for plates 24 and 28 and a phenolic composition has been chosen for plates 40 and 46. The dissimilarity of the materials reduces noise and also causes any wear to take place on plates 40 and 46 since these latter plates are more easily replaced. This conducting portion is supported on the truck bolster 14 by means of bolts 48 securing a U-shaped bracket 50 thereto. The U-shaped bracket 50 is stiffened by a reinforcing member 51 welded to the inner surface of the bracket 50 adjacent the top thereof. The bracket 50 is rigidly attached by means of screws 52 to a pair of oppositely disposed block supports 54 each having an upper groove 56 and a lower helical spring pocket 58 formed therein. Rigidly attached by welding or other means to the underside of the upper plate support 38 are a pair of oppositely disposed keys 60 adapted to ride in the grooves or slots 56 and engage helical springs 62 residing in the spring pockets 58. It will be noted that by supporting the blocks 54 on the bracket 50 the helical springs 62 urge the keys 60 and the upper wear plate 40 upward so that the upper surface of plate 40 makes frictional contact with the lower surface of the wear plate 24. A pair of U-shaped brackets 64 rigidly fastened to the keys 60 cooperate with these keys and the block 54 to prevent transverse movement of the upper wear plate 40 with respect to the bracket 50 and the truck bolster 14.

The outwardly facing surface of the lower wear plate 46 is maintained in frictional engagement with the outwardly facing surface of the wear plate 28 attached to traction motor housing 8 by means of the weighted spacer 44 acting under the usual forces of gravity. In order to prevent anything more than very limited transverse movement of the lower wear plate 46 with respect to the bracket 50 a second pair of U-shaped brackets 66 are welded to the spacer 44 and partially embrace the block supports 54.

Referring now to Figure 2 it will be noted that since the cooling duct assembly 32 is more or less rigidly attached to the bolster 14 the cooling duct 32 will move laterally and transversely about the same centers that the bolster moves about. In other words, this cooling duct assembly is essentially a free floating structure when considered with respect to the traction motor housing and the locomotive body. This feature allows the cooling duct to take an intermediate position with respect to the locomotive body and the traction motor housing thereby conducting a greater percentage of air from the passage 22 to the traction motor housing than would otherwise result if a cooling duct were connected directly to the bottom of the locomotive truck or the traction motor housing. In addition to the above advantage it will be appreciated that when it is necessary to remove a traction motor for repair or replacement it will be unnecessary to first remove this cooling duct system from the housing. The unique structure described enjoys the further advantage of eliminating certain unnecessary construction which would be necessary if the cooling duct were connected to the bottom of the locomotive body.

I claim:

1. In a locomotive, a locomotive truck frame having supporting wheels rotatably attached thereto, a traction motor housing supported on said frame, a bolster supported on said frame, a locomotive body supported on said bolster, a surface defining the terminus of a cooling passage in said locomotive body, a surface defining an opening in said traction motor housing, and duct means supported on said bolster and connecting said terminus with said opening to conduct cooling media supplied to the passage in said locomotive body to said traction motor housing, the ends of said duct means engaging said surfaces and being slidable thereon.

2. In a railway vehicle, a coolant receiving unit having a coolant receiving opening therein, a coolant supply unit having an opening therein for dispensing cooling media, said coolant supply unit being movable relative to said coolant receiving unit, intermediate means associated with said units for relative movement with respect thereto, and duct means attached to said intermediate means for conducting cooling media from said dispensing opening to said receiving opening, said duct means having open ends adapted to engage said units and move relative thereto.

3. In a locomotive, a locomotive truck frame having supporting wheels rotatably attached thereto, a traction motor housing supported on said frame, a bolster movably supported on said frame, a locomotive body movably supported on said bolster, a surface defining the terminus of a cooling passage in said locomotive body, a surface defining an opening in said traction motor housing, and duct means supported on said bolster and interposed between said surfaces adapted to conduct cooling air supplied to the passage in said locomotive body from said terminus to said traction motor housing, said duct means having open ends which engage said surfaces and are movable laterally relative thereto.

4. In a locomotive, a locomotive truck frame having supporting wheels rotatably attached thereto, a traction motor housing supported on said frame, a bolster movably supported on said frame, a locomotive body movably supported on said bolster, a downwardly facing surface defining the terminus of a cooling passage in said locomotive body, and upwardly facing surface defining an opening in said traction motor housing, said opening being substantially opposite said terminus, and duct means supported on said bolster and interposed between said surfaces adapted to conduct cooling air supplied to said passage in said locomotive body from said terminus to said traction motor housing, said duct means having open ends which engage said surfaces and are horizontally movable relative thereto.

5. In a locomotive, a locomotive body having a downwardly facing surface defining the terminus of an air cooling passage within said body, a locomotive truck frame having supporting wheels rotatably attached thereto and supporting a traction motor housing, said housing having a cooling opening defined by an upwardly facing surface substantially oppositely disposed with respect to said downwardly facing surface, a bolster supported on said frame and adapted to move relative thereto, said bolster supporting said locomotive body for relative movement with respect thereto, and cooling duct means rigidly supported on said bolster and interposed between said oppositely disposed surfaces for horizontal movement relative thereto and adapted to conduct cooling air from said terminus to said traction motor housing.

6. In a locomotive, a locomotive truck frame having supporting wheels rotatably attached thereto, a traction motor housing resiliently supported at one end thereof on said frame, a bolster resiliently supported on said frame, a locomotive body pivotally supported on said bolster, a downwardly facing surface defining the terminus of a cooling passage on said locomotive body, an upwardly facing surface defining an opening in said traction motor housing, and duct means rigidly supported on said bolster and interposed between and engaging said surfaces for horizontal movement relative thereto to conduct cooling air supplied to said passage in said locomotive body from said terminus to said traction motor housing.

7. In a locomotive, a locomotive body having a downwardly facing frictional flange defining the terminus of an air cooling passage located within said body, a locomotive truck frame having supporting wheels rotatably attached thereto and supporting a traction motor housing, said housing having a cooling air opening defined by an upwardly facing frictional flange substantially oppositely disposed with respect to said downwardly facing flange, a bolster resiliently supported on said frame and adapted to move relative thereto, said bolster resiliently supporting said locomotive body for relative movement with respect thereto, and cooling duct means supported on said bolster and interposed between said oppositely disposed flanges and adapted to conduct cooling air from said terminus to said traction motor housing, said means including oppositely disposed frictional surfaces having defined openings therein which are maintained apart and each in frictional engagement with one of said flanges.

8. In a locomotive truck frame having supporting wheels rotatably attached thereto, a traction motor housing supported on said frame, a bolster movably supported on said frame, a locomotive body movably supported on said bolster, a surface defining the terminus of a cooling passage in said locomotive body, a surface defining an opening in said traction motor housing, duct means supported on said bolster and interposed between said surfaces adapted to conduct cooling air supplied to the passage in said locomotive body from said terminus to said traction motor housing, said duct means including a pair of oppositely disposed surfaces having defined openings therein, a collapsible conduit connecting said defined openings, and resilient spring means for maintaining each of said last two mentioned surfaces in frictional engagement with one of said first two mentioned surfaces.

9. In a locomotive, a locomotive truck frame having supporting wheels rotatably attached thereto, a traction motor housing supported on said frame, a bolster movably supported on said frame, a locomotive body movably supported on said bolster, a surface defining the terminus of a cooling passage in said locomotive body, a surface defining an opening in said traction motor housing, a collapsible conduit supported on said bolster and having open ends defined by oppositely disposed rigid surfaces, said conduit normally being maintained in a state of non-collapse by resilient means adapted to maintain said rigid surfaces apart, said resilient means also being adapted to maintain one of said rigid surfaces in sliding frictional engagement with the surface defining the terminum of a cooling passage in said locomotive body, said other rigid surface being maintained in sliding frictional engagement with the surface defining an opening in said traction motor housing by the force of gravity acting thereupon.

10. In a locomotive, a locomotive body, a truck including a wheeled frame and a bolster supported on said frame in a manner permitting limited longitudinal, transverse and vertical movement with respect to said frame, the said bolster supporting said locomotive body on said truck for movement relative thereto, a traction motor including a housing therefor carried by said truck frame having an upwardly facing cooling duct opening therein with a horizontally disposed friction flange therearound, the said locomotive body having a downwardly facing cooling duct opening therein with a horizontally disposed friction flange therearound, an air duct assembly comprising upper and lower centrally apertured and separated friction plates, a bellows between said friction plates fixed thereto in hermetically sealed relationship around the apertures therein, a cylinder including spring loaded means disposed between said friction plates and tending to expand said bellows and urge said friction plates further apart, and bracket means supporting said air duct assembly from said bolster with the friction plates of said air duct assembly in slidable compressive contact with the duct friction flanges of said locomotive body and said traction motor housing.

11. In a locomotive, a locomotive truck, a traction motor housing supported on said truck, a locomotive body movably supported on said truck, a surface defining the terminus of a cooling passage in said locomotive body, a surface defining an opening in said traction motor housing, duct means extending between said surfaces having open ends adjacent said terminus and said opening movable relative to said terminus and opening enabling said duct means to conduct coolant from said terminus to said opening upon extended movement of said body on said truck, and resilient means interposed between said ends yieldably maintaining said ends apart.

References Cited in the file of this patent

UNITED STATES PATENTS

| | | |
|---|---|---|
| 1,795,266 | Smith | Mar. 3, 1931 |
| 2,230,580 | Adams et al. | Feb. 4, 1941 |
| 2,258,656 | McCormick | Oct. 14, 1941 |